(12) United States Patent
Nagatsuka

(10) Patent No.: US 6,744,849 B2
(45) Date of Patent: Jun. 1, 2004

(54) IMAGE PROCESSING APPARATUS, IMAGE PROCESSING METHOD, PROGRAM, AND STORAGE MEDIUM

(75) Inventor: Sumiya Nagatsuka, Hino (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 10/322,670

(22) Filed: Dec. 17, 2002

(65) Prior Publication Data

US 2003/0123617 A1 Jul. 3, 2003

(30) Foreign Application Priority Data

Dec. 27, 2001 (JP) ........................................ 2001-397270

(51) Int. Cl.$^7$ .............................................. G01N 23/02
(52) U.S. Cl. ........................................ 378/62; 378/98.2
(58) Field of Search ........................... 378/51, 62, 98.2, 378/901

(56) References Cited

U.S. PATENT DOCUMENTS 5,502,775 A * 3/1996 Takeo ........................ 382/169

* cited by examiner

Primary Examiner—David V Bruce
(74) Attorney, Agent, or Firm—Squire, Sanders & Dempsey

(57) ABSTRACT

An image processing apparatus for processing a target radiation image generated by radiation transmitted through a radiographic object, which has an image data transforming device for practicing image processing in such a manner that image characteristics of the target radiation image correspond to image characteristics of a radiation image for reference determined beforehand, on the basis of image characteristics obtained from the radiation image for reference.

24 Claims, 4 Drawing Sheets

IMAGE PROCESSING APPARATUS, IMAGE PROCESSING METHOD, PROGRAM, AND STORAGE MEDIUM

BACKGROUND OF THE INVENTION

This invention relates to an image processing apparatus, an image processing method, a program, and a storage medium for making easy the comparative reading of a plurality of images for medical use.

Up to now, a lot of radiation images such as X-ray images have been used in the diagnosis of disease etc., and for the purpose of obtaining these radiation images, what is called radiography, in which a fluorescent layer (fluorescent screen) is irradiated by X-rays transmitted through a radiographic object, the visible light which is produced by the irradiation is made to irradiate a film using silver halide in the same manner as a usual photographic film, and the irradiated film is developed, has been utilized very much for a long time.

On the other hand, in recent years, it has been put into practice to use a method of producing a radiation image without using a film coated with a silver halide layer, in which a radiation image is directly picked up as a digital signal from a radiation detector such as a stimulable phosphor detector or an FPD (Flat panel detector). Further, for the purpose of making a radiation image obtained by the above-mentioned method of producing a radiation image become an image suitable for diagnosis, it has been brought into practice to apply various kinds of image processing to digital image data.

Incidentally, as regards diagnosis based on the observation of the above-mentioned radiation image, the diagnosis is carried out, for example, with a plurality of films obtained for one and the same subject (radiation images of the chest region or the abdominal region taken once a year in the case of periodical health examination, radiation images for the observation in the course of recovery taken at the first medical examination and every several weeks in the case of a fracture of a bone, etc.) put side by side on a observation device to be compared with one another. However, in the case where the radiographs to be compared with one another are the combination of direct X-ray radiographs and indirect X-ray radiographs of one and the same subject, the combination of digital images read by a film scanner and digital images read from a stimulable phosphor detector, the combination of digital images read from a stimulable phosphor detector and digital images read through the conversion of X-ray energy into electric charge, or the like, caused by various factors, image characteristics such as the size of the whole of an image, the pixel size, the number of gray scales, the resolution, and the density (the luminance) become different between one image and another. For this reason, it sometimes occurred that the above-mentioned difference in the image characteristics became the obstacle of the exact comparative reading of images, which lowered the precision of diagnosis and the efficiency of diagnosis.

Therefore, for example, in the publication of the unexamined patent application H8-146540, it is disclosed a technology in which, by the correction of image data of a radiation image using supplementary image information concerning the radiographing conditions at the time of image data generation, the image characteristics are made equal between one and another of a plurality of images, and the difference in the image characteristics caused by the difference in the radiographing conditions etc. is corrected. Through this correction, it becomes possible to make the image characteristics equal between one and another of a plurality of images supposed to become the object of the comparative reading of images, and also it becomes possible to bring it out to the maximum, the effect of the extraction of diagnosis information based on the comparative reading of images and the correlation operation between images, and improve the precision of diagnosis and the efficiency of diagnosis.

However, as regards such a conventional image forming method, because the method is premised on the supplementary image information being attached to the radiographed image data, there have been cases where a radiation image taken in the past or a radiation image taken by an old-fashioned apparatus or an apparatus manufactured by another manufacturer had no supplementary image information attached or had deficient supplementary image information. For this reason, there has been a problem that correction processing for comparative reading of images could not be carried out, or the effect of correction processing was low even if correction could be made. As the result of this, there has been cases where a radiation image taken in the past or a radiation image taken by an apparatus of another model could not be utilized effectively, which lowered the precision of diagnosis and the efficiency of diagnosis.

It is an object of this invention to improve the precision of diagnosis and the efficiency of diagnosis by the correction of image data of an old radiation image taken under some other conditions or a radiation image taken by an apparatus of some other model to make comparative reading of images easy.

SUMMARY OF THE INVENTION

The structures to solve the above-mentioned problem are as follows:

(1) An image processing apparatus for processing a target radiation image generated by radiation transmitted through a radiographic object, characterized by comprising an image data transforming means(device) for practicing image processing so as to make image characteristics of the target radiation images correspond to those of a radiation image for reference, on the basis of image characteristics obtained from said radiation image for reference determined beforehand.

In this specification, the term "image characteristics" is defined as those including, for example, the size of the whole of an image, the pixel size, the number of gray scales, the resolution, the density, the luminance, the gradation characteristic, the frequency response characteristic, etc.

(2) An image processing apparatus for processing a target radiation image generated by radiation transmitted through a radiographic object, characterized by comprising an image characteristic obtaining means (device) for obtaining the image characteristics of a radiation image for reference and the image characteristics of the target radiation image, and an image data transforming means (device) for practicing image processing of said target radiation image so as to make the image characteristics of said target radiation image correspond to the image characteristics of said radiation image for reference obtained by said image characteristic obtaining means.

Hence, by the image processing to make the image characteristics of a plurality of radiation images having different image characteristics correspond to those of a radiation image for reference, the difference in the image characteristics, for example, between radiation images taken under different radiographing conditions or radiation images subjected to different image processing methods can be dissolved, and it becomes possible to reproduce radiation images having their image characteristics made to correspond to one another.

(3) An image processing apparatus for processing a target radiation image generated by radiation transmitted through a radiographic object, characterized by comprising a region recognizing means (device) for recognizing a specified region corresponding to a fixed structure of a radiographic object, an image processing condition determining means (device) for obtaining the image characteristics through the analysis of the image signal of a specified region recognized by said region recognizing means, and determining the image processing conditions on the basis of said image characteristics, and an image data transforming means (device) for practicing image processing of a radiation image on the basis of the image processing conditions determined by said image processing condition determining means, said image processing condition determining means determining the image processing conditions on the basis of the image characteristics of a specified region to be obtained from a radiation image for reference, or on the basis of the image characteristics of a specified region to be obtained from a radiation image for reference and the image characteristics of a specified region to be obtained from the target radiation image, and said image data transforming means practicing image processing of a part or the whole of the target radiation image in such a manner that the image characteristics of the target radiation image correspond to the image characteristics of a radiation image for reference on the basis of said image processing conditions.

Hence, by the practice of the image processing of the target radiation image on the basis of a specified region of a radiation image for reference, it becomes possible to reproduce a plurality of images with their image characteristics made to correspond to one another, and for example, even for a radiation image having no supplementary image information attached concerning the radiographing conditions and the image characteristics, image processing can be carried out so as to make its image characteristics correspond to the image characteristics of a radiation image for reference. Owing to this, in the case where a plurality of radiation images are subjected to comparative reading of images, it is possible to reproduce the region to be diagnosed with satisfactory image characteristics, and improve the precision of diagnosis and the efficiency of diagnosis. Further, by the practicing of image processing on the basis of the region supposed to be the object of diagnosis, an appropriate image processing can be carried out.

(4) An image processing apparatus for processing a target radiation image generated by radiation transmitted through a radiographic object, characterized by comprising a region designating means (device) for recognizing a designated region as a specified region, an image processing condition determining means (device) for obtaining the image characteristics through the analysis of the image signal of a specified region recognized by said region designating means, and determining the image processing conditions on the basis of said image characteristics, and an image data transforming means (device) for practicing image processing of a radiation image on the basis of the image processing conditions determined by said image processing condition determining means, said image processing condition determining means (device) determining the image processing conditions on the basis of the image characteristics of a specified region to be obtained from a radiation image for reference, or on the basis of the image characteristics of a specified region to be obtained from a radiation image for reference and the image characteristics of a specified region to be obtained from the target radiation image, and said image data transforming means practicing image processing for a part or the whole of the target radiation image in such a manner that the image characteristics of the target radiation image correspond to the image characteristics of a radiation image for reference on the basis of said image processing conditions.

Hence, when image processing of the target radiation image is carried out so as to make its image characteristics correspond to the image characteristics of a radiation image for reference, a specified region of the radiation image for reference can be designated arbitrarily; therefore, in accordance with the state of the radiation image for reference, the image processing conditions can be determined with the optimum region used as the reference. Further, because it is possible to carry out an image processing of a high degree of freedom adapted to the preference of the diagnosis making person, the efficiency of diagnosis can be improved.

(5) An image processing apparatus as set forth in any one of the structures (1) to (4), characterized by the aforesaid radiation image for reference being generated on the basis of radiation transmitted through the same region of the same radiographic object as the aforesaid the target radiation image.

Hence, because it is possible to carry out image processing on the basis of a radiation image for reference with corresponding regions definitely specified in the radiation image for reference and the target radiation image, it is possible to reproduce a plurality of radiation images with uniform image characteristics. Further, for example, even for a radiation image which has undergone an image processing different from that of a radiation image for reference, if it is the one of the same region of the same radiographic object as that of the radiation image for reference, the difference in the image characteristics from the radiation image for reference can be recognized as the difference in the method of image processing, and the radiation image having undergone an image processing of a different method can be corrected to come to have an image characteristics close to the image characteristics of the image for reference. Owing to this, this invention can be applied to radiation images having diversified image characteristics, has a wide scope of application, and is good in facility.

(6) An image processing apparatus as set forth in the structure (3) or (4), characterized by the aforesaid radiation image having supplementary image information showing the image characteristics attached, and the aforesaid image processing condition determining means determining the image processing conditions on the basis of the image characteristics obtained from said supplementary image information, and the image characteristics obtained through the analysis of the image signal of the specified region recognized by the aforesaid region recognizing means or the aforesaid region designating means.

(7) An image processing apparatus as set forth in the structure (6), characterized by the aforesaid supplementary image information including at least one or more of the size of the whole of an image, the pixel size, the number of gray scales, the resolution, the density, the luminance, the gradation characteristic, the condition of the irradiation by radiation, the characteristics of the radiation image conversion medium, and the condition of image reading.

Hence, in the case where supplementary image information showing the image characteristics is attached to a radiation image for reference and the target radiation image, the image processing conditions can be determined on the basis of not only the image characteristics obtained through the analysis of the image signal of the specified region obtained by the region recognizing means or the region designating means, but also the information such as the size of the image as a whole, the pixel size, the number of gray scales, the resolution, the density, the luminance, the gradation characteristic, the condition of the irradiation by radiation, the characteristics of the radiation image conversion medium, and the condition of image reading; therefore, the processing speed can be raised, and also an image processing of a high precision can be carried out.

(8) An image processing apparatus as set forth in any one of the structures (1) to (4), characterized by the aforesaid image processing including at least one of gradation processing, frequency processing, correction processing of pixel size, correction processing of the number of gray scales, compression processing of dynamic range, detection processing of an abnormal shade, position adjustment processing for correcting the positional deviation in the corresponding parts among a plurality of images, and frequency processing using a multiple resolution method.

Hence, for example, in the case where the radiation images are a plurality of time-serial images of one and the same region of one and the same radiographic object, the part changing with the passage of time can be selectively emphasized with a good precision by the practice of correction processing of the pixel size and the number of gray scales; owing to this, a change to a morbid state which has been newly generated, or a morbid part whose symptoms have varied can be easily detected. Further, by the practice of gradation processing, it is possible to correct the output density so as to make it of a constant density or of a constant contrast, on top of the gradation characteristic of the target radiation image having been made to correspond to that of a radiation for reference. Further, by the practicing of frequency processing, it becomes possible to prevent the sharpness of a radiation image being lowered and make the output of a stable image. Further, because gradation characteristic processing and frequency processing are practiced on top of the correction processing of the pixel size and the number of gray scales being carried out, it is possible to carry out an image processing of a higher precision. Besides, by the application of various kinds of image processing, it is possible to provide a high-quality radiation image.

(9) An image processing method for processing a target radiation image generated by radiation transmitted through a radiographic object, characterized by comprising a process for carrying out image processing so as to make the target radiation image have image characteristics agreeing with the image characteristics of said radiation image for reference on the basis of the image characteristics of a radiation image for reference determined beforehand.

(10) An image processing method for processing a target radiation image generated by radiation transmitted through a radiographic object, characterized by comprising a process for obtaining the image characteristics of a radiation image for reference and the image characteristics of the target radiation image, and a process for carrying out image processing of said the target radiation image so as to make the target radiation image have image characteristics agreeing with the image characteristics of said radiation image for reference.

(11) An image processing method for processing a target radiation image generated by radiation transmitted through a radiographic object, characterized by comprising a process for recognizing a specified region corresponding to a fixed structure of a radiographic object, a process for obtaining the image characteristics of a radiation image for reference or of a radiation image for reference and the target radiation image through the analysis of the image signal obtained from a specified region of a radiation image for reference or of a radiation image for reference and the target radiation image, and determining the image processing conditions on the basis of the image characteristics of said radiation image for reference or of said radiation image for reference and said target radiation image, and a process for practicing image processing for a part or the whole of the target radiation image in such a manner that the image characteristics of the target radiation image correspond to the image characteristics of a radiation image for reference on the basis of said image processing conditions.

(12) An image processing method for processing a target radiation image generated by radiation transmitted through a radiographic object, characterized by comprising a process for recognizing a designated region as a specified region, a process for obtaining the image characteristics of a radiation image for reference or of a radiation image for reference and the target radiation image through the analysis of the image signal obtained from a specified region of a radiation image for reference or of a radiation image for reference and the target radiation image, and determining the image processing conditions on the basis of the image characteristics of said radiation image for reference or of said radiation image for reference and said the target radiation image, and a process for practicing image processing of a part or the whole of the target radiation image in such a manner that the image characteristics of the target radiation image correspond to the image characteristics of a radiation image for reference on the basis of said image processing conditions.

(13) A program for actualizing a function to make a computer for processing a target radiation image generated by radiation transmitted through a radiographic object practice image processing so as to make, on the basis of the image characteristics of a radiation image for reference determined beforehand, the image characteristics of the target radiation image correspond to the image characteristics of said radiation image for reference.

(14) A program for actualizing a function to make a computer for processing a target radiation image generated by radiation transmitted through a radiographic object obtain the image characteristics of a radiation image for reference and the image characteristics of the target radiation image, and a function to make said computer practice image processing so as to make the image characteristics of said target radiation image correspond to the image characteristics of said radiation image for reference.

(15) A program for actualizing a function to make a computer for processing a target radiation image generated by radiation transmitted through a radiographic object recognize a specified region corresponding to a fixed structure of a radiographic object, a function to make said computer obtain the image characteristics through the analysis of the image signal of said specified region recognized and determine the image processing conditions on the basis of said image characteristics, a function to make said computer practice image processing of a radiation image on the basis of said image processing conditions determined, a function to make said computer determine the image processing conditions on the basis of the image characteristics of a specified region to be obtained from said radiation image for reference, or on the basis of the image characteristics of a specified region to be obtained from said radiation image for reference and the image characteristics of a specified region to be obtained from the target radiation image, and a function to make said computer practice image processing for a part or the whole of the target radiation image in such a manner that the image characteristics of the target radiation image correspond to the image characteristics of a radiation image for reference on the basis of said image processing conditions.

(16) A program for actualizing a function to make a computer for processing a target radiation image generated by radiation transmitted through a radiographic object designate a specified region, a function to make said computer obtain the image characteristics through the analysis of the image signal of said specified region designated and determine the image processing conditions on the basis of said image characteristics, a function to make said computer practice image processing of a radiation image on the basis of said image processing conditions determined, a function to make said computer determine the image processing conditions on the basis of the image characteristics of a specified region to be obtained from a radiation image for reference, or on the basis of the image characteristics of a specified region to be obtained from a radiation image for reference and the image characteristics of a specified region to be obtained from the target radiation image, and a function to make said computer practice image processing for a part or the whole of said the target radiation image in such a manner that the image characteristics of the target radiation image correspond to the image characteristics of a radiation image for reference on the basis of said image processing conditions.

(17) A storage medium having a program stored capable of being practiced by a computer for processing a target radiation image generated by radiation transmitted through a radiographic object, characterized by having a program stored including a program code capable of being practiced by a computer for practicing image processing so as to make, on the basis of the image characteristics of a radiation image for reference determined beforehand, the image characteristics of the target radiation image correspond to the image characteristics of said radiation image for reference.

(18) A storage medium having a program stored capable of being practiced by a computer for processing a target radiation image generated by radiation transmitted through a radiographic object, characterized by having a program stored including a program code for obtaining the image characteristics of a radiation image for reference and the image characteristics of the target radiation image, and a program code capable of being practiced by a computer for practicing image processing so as to make said obtained image characteristics of said target radiation image correspond to said obtained image characteristics of said radiation image for reference.

(19) A storage medium having a program stored capable of being practiced by a computer for processing a target radiation image generated by radiation transmitted through a radiographic object, characterized by having a program stored including a program code capable of being practiced by a computer for recognizing a specified region corresponding to a fixed structure of a radiographic object a program code capable of being practiced by a computer for obtaining the image characteristics of said specified region through the analysis of the image signal of said recognized specified region, and determining the image processing conditions on the basis of said image characteristics, a program code capable of being practiced by a computer for practicing image processing of a radiation image on the basis of said image processing conditions determined, a program code capable of being practiced by a computer for determining image processing conditions on the basis of the image characteristics of a specified region to be obtained from a radiation image for reference, or on the basis of the image characteristics of a specified region to be obtained from a radiation image for reference and the image characteristics of a specified region to be obtained from the target radiation image, a program code capable of being practiced by a computer for practicing the image processing of a part or the whole of said the target radiation image in such a manner that the image characteristics of the target radiation image correspond to the image characteristics of a radiation image for reference on the basis of said image processing conditions.

(20) A storage medium having a program stored capable of being practiced by a computer for processing a target radiation image generated by radiation transmitted through a radiographic object, characterized by having a program stored including a program code capable of being practiced by a computer for designating a specified region a program code capable of being practiced by a computer for obtaining the image characteristics of said specified region through the analysis of the image signal of said specified region designated, and determining the image processing conditions on the basis of said image characteristics, a program code capable of being practiced by a computer for practicing image processing of a radiation image on the basis of said image processing conditions determined, a program code capable of being practiced by a computer for determining image processing conditions on the basis of the image characteristics of a specified region to be obtained from a radiation image for reference, or on the basis of the image characteristics of a specified region to be obtained from a radiation image for reference and the image characteristics of a specified region to be obtained from the target radiation image, a program code capable of being practiced by a computer for practicing the image processing of a part or the whole of said the target radiation image in such a manner that the image characteristics of the target radiation image correspond to the image characteristics of a radiation image for reference on the basis of said image processing conditions.

DETAILED DESCRIPTION OF THE PREFERRED EMBODIMENT

First Example of the Embodiment

Figure 1:
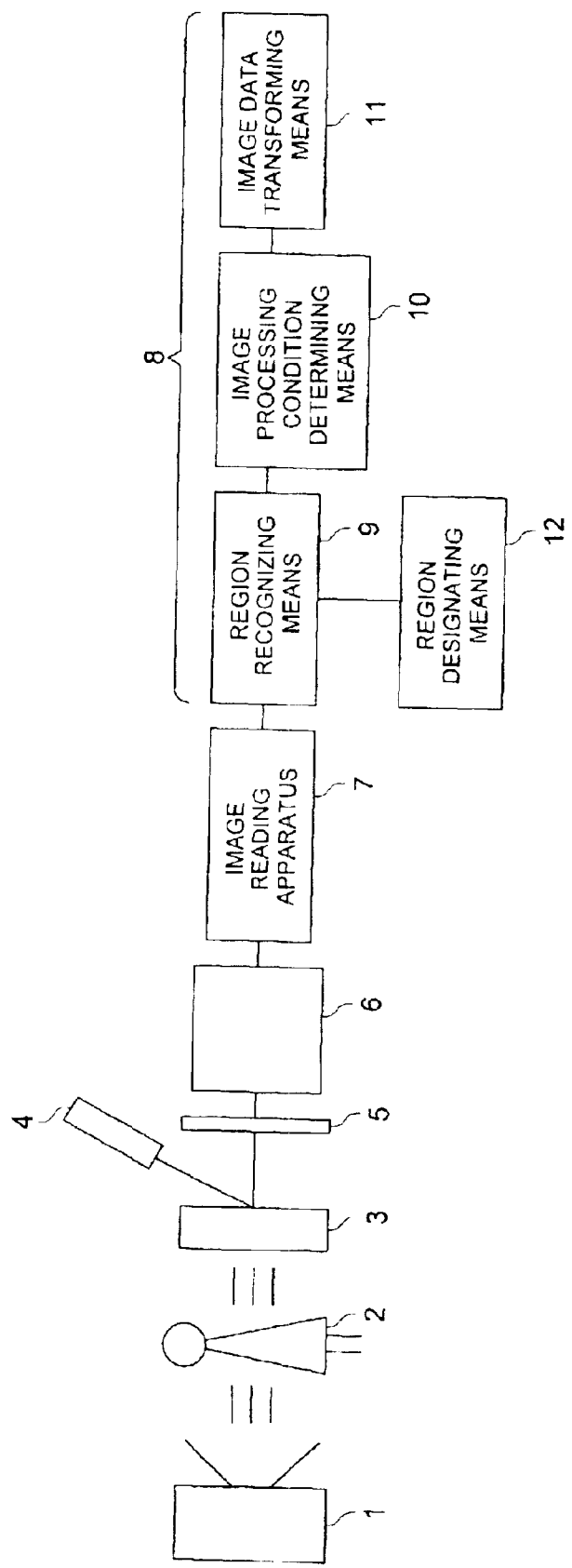
FIG. 1 is a drawing showing the system structure of an image processing system of the embodiment of this invention.

In the following, the first example of the embodiment of this invention will be explained in detail with reference to the drawings. Incidentally, the scope of the invention is not to be limited to the examples shown in the drawings. Besides, in this example of the embodiment, there is shown a case where this invention is applied to the radiography for a human body as medical use.

First, the structure will be explained.

FIG. 1 is a block diagram showing an example of an image processing system using an image processing apparatus 8 of this example of the embodiment. As shown in FIG. 1, the image processing system consists of a radiation source 1, a radiation image conversion panel 3, a stimulation inducing light source 4, a filter 5, a photoelectric converter 6, an image reading apparatus 7, an image processing apparatus 8, etc.

The radiation source 1 is controlled by a radiation control unit (not shown in the drawing), and irradiates the radiographic object by radiation (generally, X-rays). The radiation conversion panel comprises a stimulable phosphor layer on a support member formed by the vapor phase deposition of a stimulable phosphor or the coating of a stimulable phosphor. When exciting rays such as X-rays, an electron beam, or ultraviolet rays irradiates this phosphor layer, a part of its energy is accumulated in accordance with the quantity of the irradiation. By this effect, the radiation image conversion panel 3 accumulates energy in the stimulable phosphor layer contained inside in accordance with the distribution of the radiation transmittance of the radiographic object 2 for the radiation emitted from the radiation source 1, to form a latent image, that is, the radiation image of the radiographic object. For the material of the stimulable phosphor, for example, materials disclosed in the publication of the unexamined patent applications S61-72091, and S59-75200 can be utilized.

The stimulation inducing light source 4 emits stimulation inducing light such as visible light or infrared light for irradiating the above-mentioned radiation image conversion panel 3 in a scanning way. By this irradiation, the radiation image conversion panel 3 produces the stimulated light emission of the stimulable phosphor in proportion to the accumulated energy. This light emission is inputted to the photoelectric converter 6 through the filter 5.

The photoelectric converter 6 converts the fluorescent light inputted through the filter 5 into an electric voltage signal proportional to the emitted light intensity, to output it to the image reading apparatus 7. The image reading apparatus 7 converts the inputted electric voltage signal into digital image data, to output them to the image processing apparatus 8.

Figure 2:
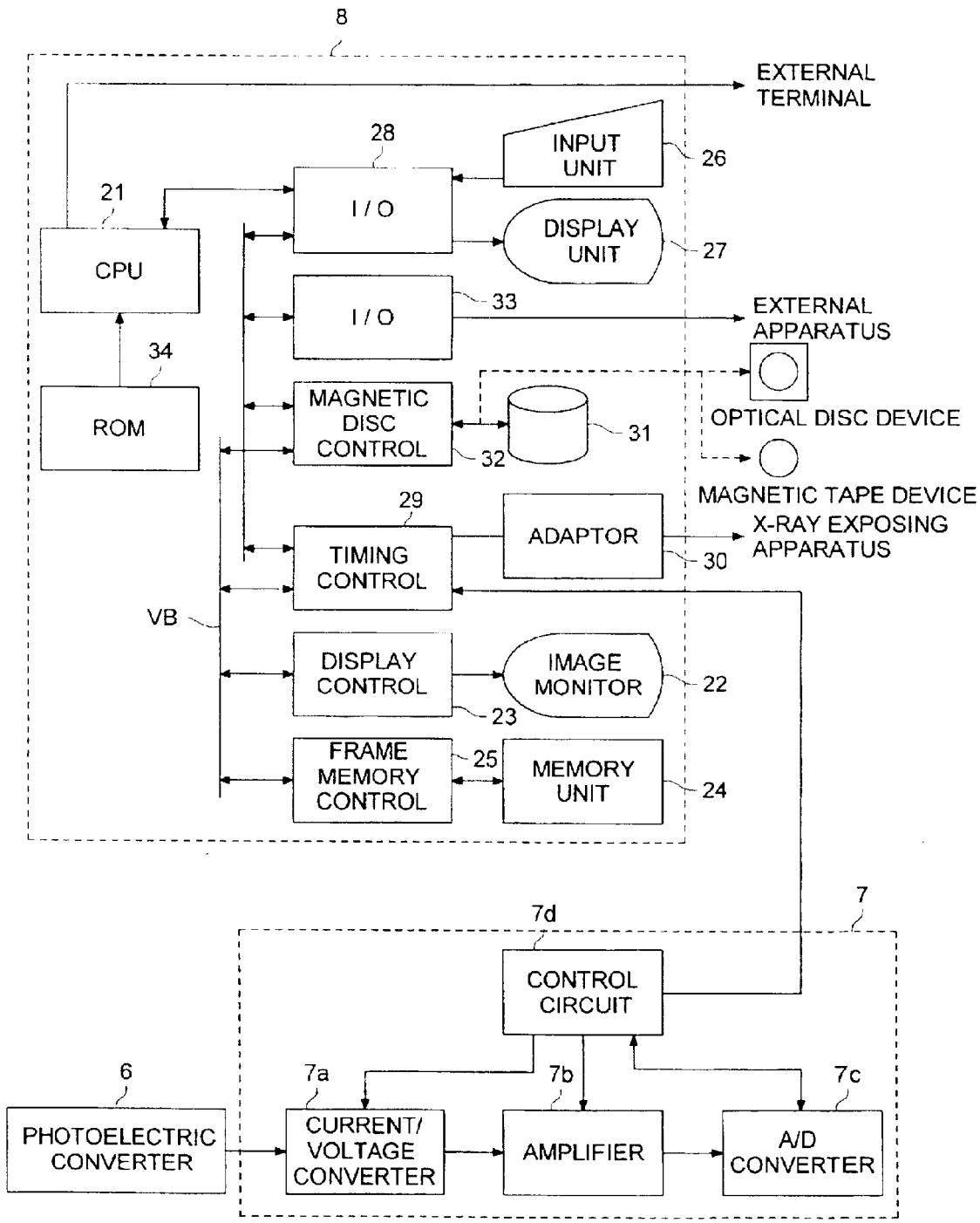
FIG. 2 is a block diagram showing the structure of the essential part of image reading apparatus 7 and the image processing apparatus 8 shown in FIG. 1.

With reference to FIG. 2, the image reading apparatus 7 and the image processing apparatus 8 will be explained in detail. FIG. 2 is a block diagram showing the essential part of the image reading apparatus 7 and the image processing apparatus 8. As shown in FIG. 2, the image reading apparatus 7 consists of a current/voltage converter 7a, an amplifier 7b, an A/D converter 7c, a control circuit 7d, etc.

The current/voltage converter 7a converts an output electric current from the photoelectric converter 6 into an electric voltage signal. The amplifier 7b amplifies the output voltage converted by the current/voltage converter 7a to output it to the A/D converter 7c. The A/D converter 7c converts the analog voltage into digital voltage data (digital image data) to output them to the control circuit 7d. The control circuit 7d carries out the gain adjustment of the current/voltage converter 7a and the amplifier 7b, and the input dynamic range adjustment of the A/D converter 7c, while it adjusts the reading gain of the radiation image information totally, and transfers the image data to the image processing apparatus 8 at a predetermined timing.

Next, as shown in FIG. 1, the image processing apparatus 8 is provided with a region recognizing means 9, image processing condition determining means 10, image data transforming means 11. The region recognizing means 9 is means for recognizing a specified region corresponding to a fixed structure of a radiographic object, and the image processing condition determining means 10 is means for analyzing the image signal of the recognized region and determining the image processing conditions for reproducing the image in such a way that its density and/or the contrast corresponds to that of the radiation image for reference. Further, the image data transforming means 11 is means for transforming image data of a radiation image on the basis of the image processing conditions determined by said image processing condition determining means 10. Every one of these means will be explained in detail later. In addition, the region recognizing means 9 is an example of a region recognizing means of this invention, the image processing condition determining means 10 is an example of an image processing condition determining means of this invention, and the image data transforming means 11 is an example of an image data transforming means of this invention.

The concrete structure of the essential part of the image processing apparatus 8 is just as one shown in FIG. 2, and is provided with a CPU 21 for controlling the above-mentioned means 9 to 11. Further, to the CPU 21, an image monitor 22 as a display means is connected through a display control section 23 and an image bus VB.

Further, there are provided an input unit 26 for inputting identification information (name, gender, date of birth, etc.) of a radiographic object, and a display unit 27 for displaying this information inputted, and the input unit 26 and the display unit 27 are connected to the above-mentioned CPU 21 through an interface 28.

Furthermore, a timing control unit 29 for outputting a timing control signal is provided; this timing control unit 29 outputs a timing control signal through an adapter 30 to the drive circuit of the aforesaid X-ray irradiation apparatus 1, and also to the above-mentioned control circuit 7d. Further, a magnetic disk 31 for recording image data is provided; to this magnetic disk 31, image data having been subjected to image processing are stored by a signal from a magnetic disk control unit 32.

Next, image processing practiced by the image processing apparatus 8 of this example of the embodiment of this invention will be explained.

The image processing apparatus 8 practices, by means of the region recognizing means 9 and the image processing condition determining means 10, region recognizing processing to extract a region of interest (ROI) in respect of image data, and gradation processing on the basis of the statistical data of an image signal obtained from the region extracted. In this case, in the case where the radiation image radiographed is an image of the chest region, the image data have a completely unnecessary part as shown by the region a in FIG. 3(a). Therefore, if the whole of image data including such an unnecessary part is subjected to image processing under a uniform condition, in some cases, the lung region supposed to be the object of diagnosis becomes lacking in sharpness due to the unnecessary part, forming an image with the capability of diagnosis lowered. Hence, by the practicing of region recognizing processing, it is possible to practice a suitable gradation processing through the discriminating of the region supposed to be the object of diagnosis from the other regions to make the image processing based on the region supposed to be the object of diagnosis.

Further, because the image processing apparatus 8 has a role to apply the result of the analysis of a radiation image for reference to another radiation image, explanation will be given in the order of processing for a radiation image for reference at first, and processing for a similar image which is similar to the radiation image for reference next. In addition, the radiation image for reference means a radiation image which has been radiographed and read by an apparatus supposed to be the reference in each process, and an arbitrary image can be determined to be one; desirably, it should be a radiation image radiographed by an apparatus of a latest model, having supplementary image information (the size of the whole of an image, the pixel size, the number of gray scales, the density, the luminance, the gradation characteristic, the condition of irradiation by radiation, the characteristics of the radiation image conversion medium, the image reading conditions, etc.) attached. Further, the similar image means a radiation image which was radiographed and read by a different apparatus from one used for a radiation image for reference in each process, or radiographed in the past by the same apparatus the radiation image for reference, of the same region of the same radiographic object as the one for reference or of a similar radiographic object to the one for reference such as the counterpart region of symmetrical regions. In the following, with reference to FIG. 3(a) and FIG. 3(b), the image processing of these images will be explained.

In detecting an ROI, the region recognizing means 9 obtains the profile corresponding to image data of the radiation image for reference. The profile is a graph showing the variation of the pixel value on an arbitrary line segment with the position on the line segment taken for the abscissa, and the pixel value taken for the ordinate. Further, by the scanning of the horizontal profile P1 and the vertical profile P2, their minimum values, maximum values, inflection points, intersection points with a threshold line, etc. are obtained, and the characteristic values of the ROI are calculated on the basis of these.

Figure 3:
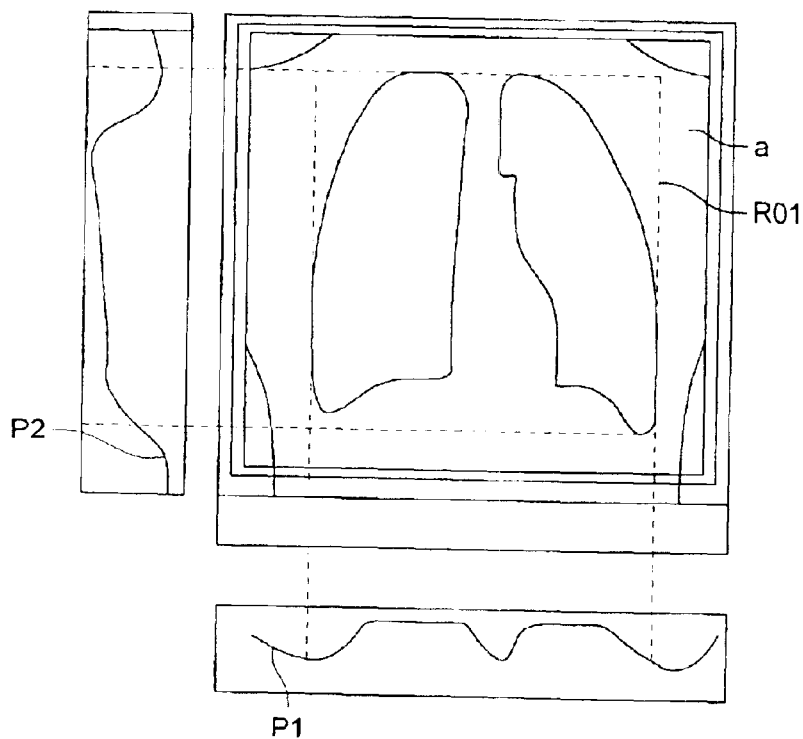
FIG. 3(a) is a drawing showing the ROI recognized by the region recognizing means 9 shown in FIG. 1.
FIG. 3(b) is a drawing showing the histogram of the ROI.
Figure 3:
Figure 3:
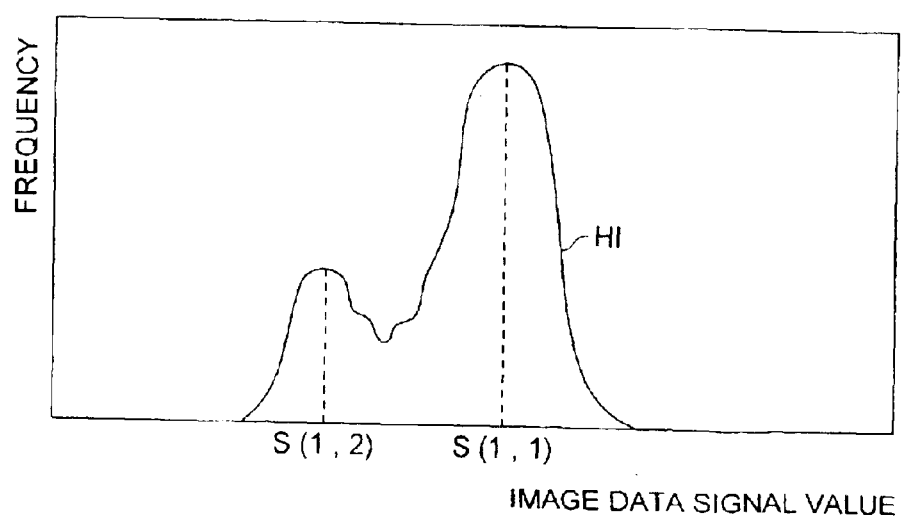

Subsequently, the image processing condition determining means 10 carries out the calculation of the representative signal value S. FIG. 3(b) is a graph showing an example of the histogram obtained from the image data of an ROI. As shown in FIG. 3(b), the image processing condition determining means 10 processes statistically the image data of the ROI, and obtains the histogram which is the frequency distribution of the image data; then, it carries out the analysis of the frequency distribution and detects the representative signal values S(m, n). In FIG. 3(b), an example in which a plurality of representative values S(1, 1) and S(1, 2) are detected as the representative signal values S(m, n). The analysis of the frequency distribution of the signal values is actualized by the use of a method such as deferential processing or integral processing.

Besides, to explain the numerical values in the parentheses of the above-mentioned representative signal values S(m, n) in detail, m denotes the discrimination of an image obtained by every radiographing, that is, the discrimination of the image Fm; for example, a signal value corresponding to the reference image F1 is noted as a reference signal value S(1, n). Further, n denotes the discrimination of a human body structure; for example, a signal value corresponding to a human body structure A(1) is noted as a representative signal value S(m, 1), and a signal value corresponding to a human body structure A(2) is noted as a representative signal value S(m, 2).

Next, the image processing condition determining means 10 sets the image processing conditions (density, contrast, etc.) for practicing a gradation transformation suitable to the diagnosis for the reference image F1 on the basis of the reference signal values S(1, n), and carries out a gradation processing on the basis of the gradation processing condition by the image data transforming means 11. That is, the image data transforming means 11 carries out the normalization of the signal value distribution so as to make the reference signal values S(1, n) corresponding to the human body structure A(n) have a definite value of density and/or contrast; further, it determines the output density by a gradation transformation table, and transforms image data. In addition, the gradation processing condition is an example of image processing conditions of this invention.

Next, image processing of a similar image will be explained. In addition, similar images except the reference image F1 are noted as F2, F3, - - - , Fm.

First, the region recognizing means 9 detects the ROI of the similar image F2, and the image processing condition determining means 10 processes statistically the image data of the ROI, to obtain the histogram as the frequency distribution of the image data. Subsequently, the image processing condition determining means 10 recognizes the reference signal value S(1, 1) corresponding to the human body structure A(1), and the reference signal value S(1, 2) corresponding to the human body structure A(2). Successively, the image processing condition determining means 10 calculates the representative signal values S(2, 1) and S(2, 2) of the regions corresponding to the human body structures A(1) and A(2) of the similar image F2 respectively.

Further, the image processing condition determining means 10 sets the gradation characteristic on the basis of the reference signal values of the reference image F1, in such a manner as to make the representative signal values S(2, 1) and S(2, 2) correspond to the reference signal values S(1, 1) and S(1, 2) respectively. That is, the image processing condition determining means 10 carries out the setting for correction of the representative signal values S(2, n) on the basis of the reference signal values S(1, n), and carries out the normalization of the signal value distribution in such a way as to make the representative signal values S(2, n) subjected to the setting for correction a definite density and/or contrast, to determine the gradation processing condition. Then, the image data transforming means 11 carries out the gradation processing of the whole image data on the basis of the gradation processing condition determined.

In this way, for the representative signal values S(m, n) which are the parameter in the determination of the gradation processing condition of the similar image Fm, by the use of a part or the whole of the reference signal values S(1, n) which are the parameter used in the determination of the gradation characteristic condition of the reference image F1, it is possible to carry out the image processing of one and the same human body structure A(n) always with a constant gradation. In addition, in this example of practice, explanation has been made by using an example in which two reference signal values are detected for one image, but the number of the reference signal values to be detected is not limited to this, and it may be one or three or more.

Further, the image processing apparatus 8 practices frequency processing of image data. By frequency processing, a spatial frequency response characteristic of an image is adjusted, and the image of a human body structure is outputted more sharply. Frequency processing is expressed by the following equation. In addition, the detail of the equation is disclosed in the publication of the examined patent application S62-62376.

$$S = Sorg + \beta(Sorg - Sus) \quad (1),$$

S: displayed image data (result of processing),
Sorg: image data (original image data),
Sus: image data to be sharpened,
β: enhancement coefficient.

By the practice of this image processing, trabeculae of bone, a fracture of a bone, the contour of an internal organ, etc. can be depicted clearly; in this point, it can be said that the image processing is particularly effective.

Now, in the practicing of a frequency processing, it is carried out the correction of β for the purpose of making the image characteristics of the reference image F1 and the similar image Fm correspond to each other. To state it in detail, as described in the above, the image processing condition determining means 10 obtains a representative signal value S(m, 1) and a representative signal value S(m, 2) through a signal value analysis such as the histogram analysis of the similar image Fm. Next, from the representative values S obtained, it determines the reference quantity Sa which is an example of the index of this invention on the basis of the equation shown below. In other words, the reference quantity Sa is calculated on the basis of the equation (2) noted below, from the two representative signal values S(m, 1) and S(m, 2), by the use of a function z=f(x, y) where x=S(m, 1) and y=S(m, 2).

$$Sa = f(S(m, 1), S(m,2)) \quad (2).$$

In the above-mentioned equation, if the function z=f(x, y) is, for example, the equation (3) noted below, the reference quantity Sa shows the width of the histogram of a signal value distribution.

$$f(x, y) = |x - y| \quad (3).$$

On the basis of the reference quantity Sa obtained in this way, the correction of the enhancement coefficient β of frequency processing is carried out. That is, by the operation expressed by the equation (4) noted below being carried out, βm which is obtained from the correction applied to the enhancement coefficient β1 of the reference image F1 calculated from the above-mentioned equation (1) is set as the enhancement coefficient of the similar image Fm.

$$\beta m = \beta 1 \times k / Sa \quad (4),$$

β1: the enhancement coefficient of reference image F1,
βm: the enhancement coefficient of similar image Fm,
k: a constant.

In addition, the correction condition of the enhancement coefficient β is an example of the image processing conditions of this invention.

Further, the image data transforming means 11 practices the frequency processing of the whole image data on the basis of the above-mentioned enhancement coefficient βm calculated. According to the equation (4), the smaller Sa representing the width of a histogram becomes, the larger the enhancement coefficient βm becomes, which makes it possible to make amends for the sharpness lowered with the width of the histogram being reduced.

It is also possible that the image processing apparatus 8 has a structure such that it corrects the pixel size and the number of gray scales of a similar image Fm so as to make them correspond to the pixel size and the number of gray scales of a reference image F1 on the basis of the pixel size and the number of gray scales of the specified region obtained by the region recognizing means 9, before it carries out a gradation processing and a frequency processing.

For example, in the case where there is some difference in the pixel size between the reference image F1 and the similar image Fm obtained, it is appropriate to carry out the correction to make the pixel size of the similar image Fm correspond to the pixel size of F1, or to unify the pixel sizes of the reference image F1 and similar image Fm to a specified pixel size. In this case, the specified pixel size is an example of the image processing conditions of this invention, and it is desirable that it falls within a range of 0.02 mm to 1.6 mm for example, and it is more desirable that the range is 0.04 mm to 0.8 mm.

Besides, in the correction processing of the pixel size, if it is intended to enlarge the pixel size, thinning-out processing of image data, averaging reduction, or interpolation reduction is carried out, and if it is intended to make the pixel size smaller (to make the number of pixels larger), interpolation enlargement using an interpolation operation such as linear interpolation, or Spline interpolation is carried out. Further, as regards the correction of a pixel size, it may be of such a structure that not only the pixel size of the ROI recognized by the region recognizing means 9 is corrected, but also the pixel size of the whole image data is corrected on the basis of the ROI.

Further, in the case where there is some difference in the gradation number between the reference image F1 and the similar image Fm obtained, it is appropriate to carry out the correction to make the number of gray scales of the similar image Fm correspond to the number of gray scales of F1, or to unify the numbers of gray scales of the reference image F1 and similar image Fm to a specified number of gray scales. In this case, the specified number of gray scales is an example of the image processing conditions of this invention, and it is desirable that it falls within a range of 7 bits to 16 bits for example, and it is more desirable that the range is 8 bits to 12 bits. In addition, in the correction processing of the number of gray scales, it is carried out a processing to multiply all image data by a constant, or a processing to transform data into data of a format of the desired number of bits after they are divided by a constant.

In this way, in a plurality of radiation images supposed to be the object of comparative image reading, after the practice of the correction processing to make the pixel sizes and the numbers of gray scales become unified, gradation processing and frequency processing can be carried out, and a processing of higher precision can be carried out. Further, in the case where the radiographs are time-serial ones of one and the same region of one and the same radiographic object, by the practice of the above-mentioned correction processing of the pixel size and the number of gray scales, the portion changing with the passage of time of the radiographic object can be selectively enhanced with a good precision, and a newly generated change to a morbid state or a morbid portion with its symptom changed can be easily detected.

Besides, as regards the image processing, in addition to the above-mentioned gradation processing, frequency processing, correction processing of the pixel size, correction processing of the number of gray scales, it may include dynamic range compression processing (disclosed in the publication of the unexamined patent application S62-125481), position adjustment processing for correcting the positional deviation of the corresponding portions among a plurality of images (disclosed in the publication of the examined patent application S61-14553, publication of the unexamined patent applications S63-278183, H1-70236), frequency processing using a multiple resolution method (disclosed in the publication of the unexamined patent application H11-345331), etc.

Further, in the first example of the embodiment of this invention, a signal value distribution is obtained through the statistical processing of the image data of the region recognized by the region recognizing means 9, and various kinds of image processing are practiced; however, in the case where supplementary image information is attached to image data, it is also appropriate a structure such that an image processing based on the above-mentioned supplementary image information, accompanied by the above-mentioned one, is carried out. Owing to this, it is possible to make higher the speed of image processing by the reduction of the number of steps of the procedure in the processing, and also it is possible to practice an image processing of a higher precision.

By the image processing apparatus 8 of the first example of the embodiment, in a plurality of radiation images obtained by the radiographing of one and the same region of one and the same radiographic object, a radiation image for reference is set, and image data are obtained through the recognition of the specified region of the reference image, while corresponding region of another similar image is recognized and the image data are obtained. Then, on the basis of the image data of the specified region of the reference image obtained, image processing of the reference image is carried out under optimum image processing conditions, while the image data of the reference image and the image data of another similar image are compared with each other, and image processing of the similar image is carried out so that its image characteristics correspond to the image characteristics of the reference image.

Hence, for example, as regards even a similar image with no supplementary image information attached, by recognizing the region corresponding to the specified region of the reference image and analyzing the image data, we can obtain the image characteristics of the similar image. Further, by practicing image processing on the basis of the difference between the image characteristics of the reference image and these image characteristics, we can reproduce an image which was radiographed and obtained in the past earlier than the reference image or an image radiographed by an apparatus of a different model with image characteristics equal to those of the reference image.

Further, also as regards a similar image which was radiographed by a method different from that used for the reference image or a similar image radiographed under conditions different from those used for the reference image, by the carrying out of an image processing based on the reference image, the image characteristics can be made to correspond to those of the reference image. In short, because this invention can be applied to any radiation image, it has a wide scope of application and enhanced convenience.

Further, for example, in the case where a radiation image which was radiographed and obtained by an apparatus of a latest model is set as a reference image, image processing of a radiation image which was radiographed and obtained in the past earlier than this or radiographed and obtained by an apparatus of a different model is carried out in such a manner that its image characteristics correspond to those of the reference radiation image; therefore, the image characteristics can be made to become close to the image characteristics of a radiation image which was radiographed and obtained by an apparatus of a latest model. As the result of this, not only to make the image characteristics of a plurality of radiation images equal to one another, but also to provide a higher-precision radiation image becomes possible, and it is also possible to achieve the improvement of the precision of diagnosis in comparative image reading and the efficiency of diagnosis.

Second Example of the Embodiment

Next, the second example of the embodiment of this invention will be explained.

In addition, image processing in this second example of the embodiment of this invention is practiced by means of the image processing apparatus 8 in the image processing system 100 shown in the first example of the embodiment of the invention. That is, because the image processing system 100 and the image processing apparatus 8 in this second example of the embodiment of this invention have approximately the same structure as the above-mentioned first example of the embodiment, as regards the structure of the same parts, to show in the drawing and explain it will be omitted. In the following, the image processing apparatus 8 for practicing a processing characterizing this second example of the embodiment of this invention will be explained.

In this second example of the embodiment, the image processing apparatus 8 is characterized by further comprising a region designating means 12. When an operator, during his displaying a reference image F1 on an image monitor 22, directly selects an arbitrary part of interest he intends to observe with a touch pen or the like, this region designating means 12 designates the selected part as a specified region. In addition, the region designating means 12 is an example of the region designating means of this invention.

Figure 4:
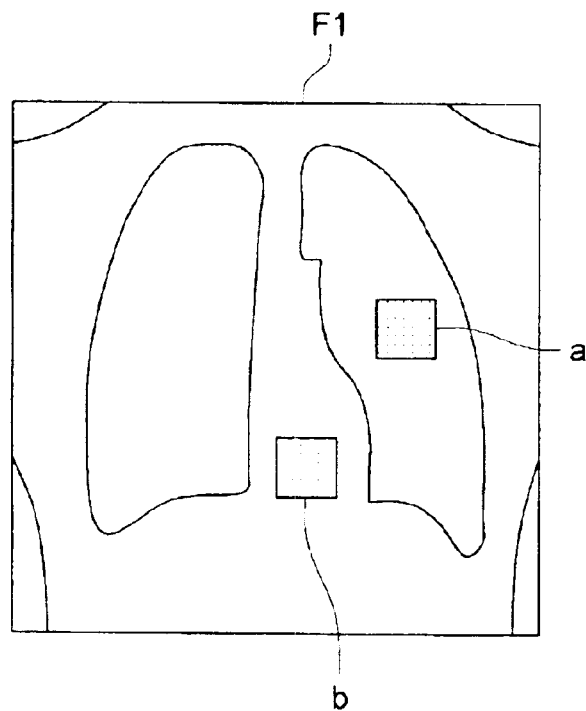
FIG. 4(a) is a drawing showing the designated regions a and b recognized by the region designating means 12 in an reference image F1.
FIG. 4(b) is a drawing showing the designated regions a and b recognized by the region designating means 12 in a similar image Fm.
Figure 4:
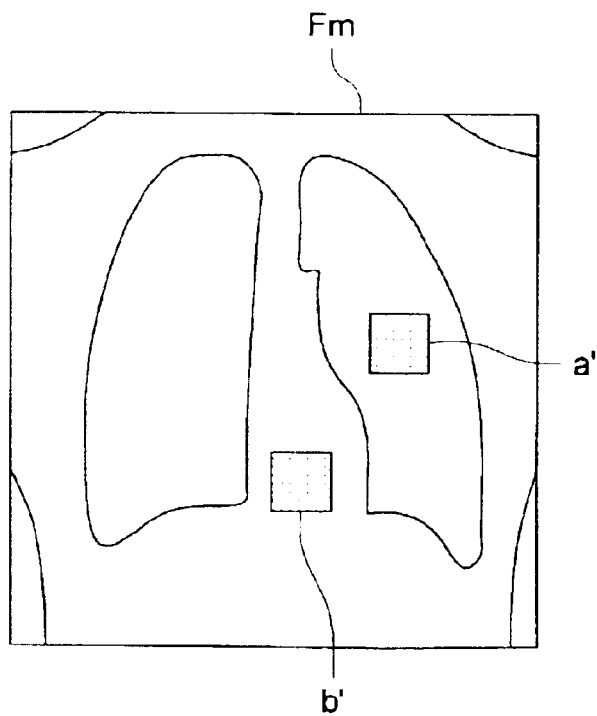

Subsequently, with reference to FIG. 4, an image processing method in this second example of the embodiment will be explained. In the case where parts of interest of the reference image F1 are selected through an input unit 26, as shown in FIG. 4(*a*), the region designating means 12 designates these parts of interest as a specified region "a" (n=1) and a specified region "b" (n=2). Subsequently, the image processing condition determining means 10 statistically processes the specified regions "a" and "b" designated by the region designating means 12, and carries out the analysis of the signal value distribution, to give S(1, 1) and S(1,2) in the same way as the first example of the embodiment.

Further, as shown in FIG. 4(*b*), through the automatic recognition of the corresponding region of a similar image Fm as an object of comparative image reading by the region recognizing means 9, or through the manual designation of it by means of the region designating means 12, the image processing condition determining means 10 processes statistically the image data of the specified regions a (n=1) and b (n=2) of the similar image Fm recognized, and carries out the analysis of the signal value distribution. Successively, by the comparison of the representative signal values S(m, 1) and S(m, 2) of the similar image Fm with the reference signal values S(1, 1) and S(1, 2) of the reference image F1, both obtained as the result of the analysis of the signal value distribution, various kinds of image processing condition are obtained by the use of a similar method to that used in the above-mentioned first example of the embodiment.

Then, on the basis of the various kinds of image processing condition obtained, the image data transforming means 11 applies gradation processing, frequency processing, correction processing of the pixel size, correction processing of the number of gray levels, etc. to the reference image F1 and the similar image Fm. In addition, as regards the number of the part of interest to be designated, at least two of them enables image processing; however, it is desirable for the purpose of carrying out image processing at a high precision to designate a plurality of them.

As described in the above, by this second example of the embodiment, it is possible to designate an arbitrary part of a reference image F1 as a specified region by the instruction of an operator, and practice the image processing of the reference image F1 and a similar image Fm on the basis of the image characteristics of the image data of the designated region; therefore, it is possible to carry out an image processing in accordance with the condition of the radiation image, with the optimum region used as the reference. Owing to this, a high-precision image processing can be carried out, and in comparative reading of a plurality of radiation images, it is possible to reproduce them with equal image characteristics and improve the precision of diagnosis.

By an invention as set forth in the structure (1), (2), (9), (10), (13), (14), (17), or (18), by the practice of image processing of a plurality of radiation images having different image characteristics to make their image characteristics correspond to those of a radiation image for reference, it is possible to dissolve the difference in the image characteristics of, for example, radiation images radiographed under different radiographing conditions or radiation images subjected to image processing by different image processing methods, and reproduce radiation images having image characteristics made to correspond to one another.

By an invention as set forth in the structure (3), (11), (15), or (19), by the practice of image processing of the target radiation image based on a specified region of a radiation image for reference, it is possible to reproduce a plurality of radiation images with their image characteristics made to correspond to one another; for example, even for a radiation image having no supplementary image information concerning the radiographing conditions or the image characteristics attached, image processing can be carried out in such a manner that its image characteristics correspond to those of a radiation image for reference. Therefore, in the case where a plurality of radiation images are subjected to comparative image reading, it is possible to reproduce the region of diagnosis with a good image characteristics and improve the precision of diagnosis and the efficiency of diagnosis. Further, if an image processing is done on the basis of a region supposed to be the object of diagnosis, it becomes a suitable one.

By an invention as set forth in the structure (4), (12), (16), or (20), when image processing of the target radiation image is carried out so as to make its image characteristics correspond to those of a radiation image for reference, a specified region of the radiation image for reference can be arbitrarily designated; therefore, image processing conditions can be determined with an optimum region used as the reference in accordance with the state of the radiation image for reference. Further, because an image processing having a high degree of freedom adapted to the preference of the diagnosis making person can be carried out, the efficiency of diagnosis can be improved.

By an invention as set forth in the structure (5), in addition to the effect of the invention set forth in any one of the structures (1) to (4), it is possible to definitely specify a region of a radiation image for reference corresponding to a region of the target radiation image, and carry out image processing on the basis of the radiation image for reference; therefore, it is possible to reproduce a plurality of radiation images with equal image characteristics. Further, for example, as regards even a radiation image subjected to an image processing of a different method from a radiation image for reference, so long as it was radiographed from the same region and the same radiographic object as the radiation image for reference, the difference in the image characteristics between it and the radiation image for reference can be recognized as the difference in the method of image processing; thus, a radiation image subjected to an image processing of a different method from that used for a radiation image for reference can be corrected with the image characteristics made to come close to those of the radiation image for reference. Owing to this, this invention can be applied to radiation images having diversified image characteristics, has a wide scope of application, and is good in facility.

By an invention as set forth in the structure (6), or (7), in addition to the effect of the invention set forth in the structure (3) or (4), in the case where supplementary image information showing image characteristics is attached to a radiation image for reference and the target radiation image, image processing conditions can be determined on the basis of not only the image characteristics to be obtained by the analysis of the image signal of a specified region obtained by the region recognizing means or the region designating means, but also information obtained from the supplementary image information such as the size of the whole of the image, the pixel size, the number of gray scales, the resolution, the density, the luminance, the gradation characteristic, the condition of irradiation by radiation, the characteristics of the radiation image converting medium, the image reading condition, etc.; therefore, the processing speed can be made higher, and a high-precision image processing can be carried out.

By an invention as set forth in the structure (8), in addition to the effect of the invention set forth in any one of the structures (1) to (4), by the practice of correction processing of the pixel size and the number of gray levels, for example, in the case where a radiation image is one of a plurality of time-serial radiation images of one and the same region of one and the same radiographic object, its portion changing with the passage of time can be selectively emphasized with a high precision, and owing to this, it is possible to detect easily a newly generated change to a morbid state or a morbid portion with its symptom varied. Further, by the practice of gradation processing, on top of the gradation characteristics of the target radiation image being made to correspond to those of a radiation image for reference, the output density can be corrected in such a way that the radiation image has a definite density and/or a definite contrast. Further, by the practice of frequency processing, it is possible to prevent the lowering of sharpness of a radiation image, and carry out the output of a stable image. Further, because gradation processing and frequency processing are carried out on top of the correction processing of the pixel size and the number of gray scales having been carried out, a higher-precision image processing can be carried out. By the application of various kinds of image processing other than the above-mentioned, it is possible to provide a high-quality radiation image.

What is claimed is:

1. An image processing apparatus for processing a target radiation image generated by radiation transmitted through a radiographic object, comprising an image data transforming device for practicing an image processing in such a manner that image characteristics of the target radiation image correspond to image characteristics of a radiation image for reference, which is determined beforehand, on the basis of image characteristics obtained from the radiation image for reference.

2. An image processing apparatus for processing a target radiation image generated by radiation transmitted through a radiographic object, comprising:
   an image characteristic obtaining device for obtaining image characteristics of a radiation image for reference and image characteristics of the target radiation image; and
   an image data transforming device for practicing an image processing of the target radiation image in such a manner that the image characteristics of the target radiation image correspond to the image characteristics of the radiation image for reference obtained by the image characteristic obtaining device.

3. An image processing apparatus for processing a target radiation image generated by radiation transmitted through a radiographic object, comprising:
   a region recognizing device for recognizing a specified region corresponding to a prescribed structure of a radiographic object;
   an image processing condition determining device for obtaining image characteristics through the analysis of image signals of a specified region recognized by the region recognizing device, and for determining image processing conditions on the basis of the image characteristics; and
   an image data transforming device for practicing an image processing of a radiation image on the basis of the image processing conditions determined by the image processing condition determining device;
   wherein the image processing condition determining device determines the image processing conditions on the basis of image characteristics of a specified region obtained from a radiation image for reference, or on the basis of the image characteristics of the specified region obtained from the radiation image for reference and image characteristics of a specified region obtained from the target radiation image, and
   wherein the image data transforming device practices the image processing of a part or the whole of the target radiation image in such a manner that the image characteristics of the target radiation image correspond to the image characteristics of the radiation image for reference on the basis of the image processing conditions.

4. An image processing apparatus for processing a target radiation image generated by radiation transmitted through a radiographic object, comprising:
   a region designating device for designating a specified region of a radiation image;
   an image processing condition determining device for obtaining image characteristics through the analysis of image signals of a specified region designated by the region designating device, and for determining image processing conditions on the basis of the image characteristics; and
   an image data transforming device for practicing an image processing of a radiation image on the basis of the image processing conditions determined by the image processing condition determining device;
   wherein the image processing condition determining device determines the image processing conditions on the basis of image characteristics of a specified region obtained from a radiation image for reference, or on the basis of the image characteristics of the specified region obtained from the radiation image for reference and image characteristics of a specified region obtained from the target radiation image, and
   wherein the image data transforming device practices the image processing of a part or the whole of the target radiation image in such a manner that the image characteristics of the target radiation image correspond to the image characteristics of the radiation image for reference on the basis of the image processing conditions.

5. The image processing apparatus of claim 1, wherein the radiation image for reference is generated on the basis of radiation transmitted through the same region of the same radiographic object as the target radiation image.

6. The image processing apparatus of claim 2, wherein the radiation image for reference is generated on the basis of radiation transmitted through the same region of the same radiographic object as the target radiation images.

7. The image processing apparatus of claim 3, wherein the target radiation image is attached with supplementary image information showing the image characteristics, and the image processing condition determining device determines the image processing conditions on the basis of the image characteristics obtained from the supplementary image information, and image characteristics obtained through the analysis of image signals of the specified region recognized by the region recognizing device.

8. The image processing apparatus of claim 4, wherein the target radiation image is attached with supplementary image information showing the image characteristics, and the image processing condition determining device determines the image processing conditions on the basis of the image characteristics obtained from the supplementary image information, and image characteristics obtained through the analysis of image signals of the specified region designated by the region designating device.

9. The image processing apparatus of claim 7, wherein the supplementary image information include at least one or more of a size of the whole of an image, a pixel size, a number of gray scales, resolution, a density, a luminance, a gradation characteristic, a condition of the irradiation by radiation, characteristics of a radiation image conversion medium, and a condition of image reading.

10. The image processing apparatus of claim 8, wherein the supplementary image information include at least one or more of a size of the whole of an image, a pixel size, a number of gray scales, resolution, a density, a luminance, a gradation characteristic, a condition of the irradiation by radiation, characteristics of a radiation image conversion medium, and a condition of image reading.

11. The image processing apparatus of claim 1, wherein the image processing includes at least one of a gradation processing, a frequency processing, a correction processing of pixel size, a correction processing of the number of gray scales, a compression processing of dynamic range, a detection processing of an abnormal shade, a position adjustment processing for correcting the positional deviation in the corresponding parts among a plurality of images, and a frequency processing using a multiple resolution method.

12. The image processing apparatus of claim 2, wherein the image processing includes at least one of a gradation processing, a frequency processing, a correction processing of pixel size, a correction processing of the number of gray scales, a compression processing of dynamic range, a detection processing of an abnormal shade, a position adjustment processing for correcting the positional deviation in the corresponding parts among a plurality of images, and a frequency processing using a multiple resolution method.

13. An image processing method for processing a target radiation image generated by radiation transmitted through a radiographic object, comprising a process for carrying out an image processing in such a manner that image characteristics of the target radiation image correspond to image characteristics of a radiation image for reference, which is determined beforehand, on the basis of image characteristics obtained from the radiation image for reference.

14. An image processing method for processing a target radiation image generated by radiation transmitted through a radiographic object, comprising:

obtaining image characteristics of a radiation image for reference and image characteristics of the target radiation image, and practicing an image processing of the target radiation image in such a manner that the image characteristics of the target radiation image correspond to the image characteristics of the radiation image for reference.

15. An image processing method for processing a target radiation image generated by radiation transmitted through a radiographic object, comprising:

recognizing a specified region corresponding to a prescribed structure of a radiographic object, obtaining image characteristics of a radiation image for reference or image characteristics of the radiation image for reference and of a specified region obtained from the target radiation image, by analyzing the image signal obtained from the radiation image for reference or obtained from the radiation image for reference and the specified region obtained from the target radiation image, and determining image processing conditions on the basis of the image characteristics of the radiation image for reference and the image characteristics of the specified region of the target radiation image, and practicing image processing of a part or the whole of the target radiation image in such a manner that the image characteristics of the target radiation image correspond to the image characteristics of the radiation image for reference on the basis of the image processing conditions.

16. An image processing method for processing a target radiation image generated by radiation transmitted through a radiographic object, comprising:

designating a specified region of the radiation image, obtaining image characteristics of a radiation image for reference or image characteristics of the radiation image for reference and of a specified region obtained from the target radiation image, by analyzing the image signal obtained from the radiation image for reference or obtained from the radiation image for reference and the specified region obtained from the target radiation image, and determining image processing conditions on the basis of the image characteristics of the radiation image for reference and the image characteristics of the specified region of the target radiation image, and practicing image processing of a part or the whole of the target radiation image in such a manner that the image characteristics of the target radiation image correspond to the image characteristics of the radiation image for reference on the basis of the image processing conditions.

17. A program for making a computer for processing a target radiation image generated by radiation transmitted through a radiographic object actualize the function of practicing an image processing in such a manner that image characteristics of the target radiation image correspond to image characteristics of a radiation image for reference, which is determined beforehand, on the basis of image characteristics obtained from the radiation image for reference.

18. A program for making a computer for processing a target radiation image generated by radiation transmitted through a radiographic object actualize the functions of:

obtaining image characteristics of a radiation image for reference and image characteristics of the target radiation image; and practicing image processing in such a manner that the image characteristics of the target radiation image correspond to the image characteristics of the radiation image for reference.

19. A program for making a computer for processing a target radiation image generated by radiation transmitted through a radiographic object actualize the functions of:

recognizing a specified region corresponding to a prescribed structure of a radiographic object;

obtaining the image characteristics through the analysis of the image signal of the specified region recognized, and determining image processing conditions on the basis of the image characteristics;

practicing image processing of a radiation image on the basis of the image processing conditions determined, determining the image processing conditions on the basis of the image characteristics of the specified region obtained from the radiation image for reference, or on the basis of the image characteristics of the specified region to be obtained from the radiation image for reference and the image characteristics of the specified region obtained from the target radiation image; and practicing image processing for a part or the whole of the target radiation image in such a manner that the image characteristics of the target radiation image correspond to the image characteristics of the radiation image for reference on the basis of the image processing conditions.

20. A program for making a computer for processing a target radiation image generated by radiation transmitted through a radiographic object actualize the functions of:

A program for actualizing:

designating a specified region of the radiation image;

obtaining image characteristics through the analysis of image signals of the specified region designated, and determining image processing conditions on the basis of the image characteristics;

practicing image processing of a radiation image on the basis of the image processing conditions determined;

determining the image processing conditions on the basis of the image characteristics of the specified region obtained from the radiation image for reference, or on the basis of the image characteristics of the specified region to be obtained from the radiation image for reference and the image characteristics of the specified region obtained from the target radiation image; and practicing image processing for a part or the whole of the target radiation image in such a manner that the image characteristics of the target radiation image correspond to the image characteristics of the radiation image for reference on the basis of the image processing conditions.

21. A storage medium storing a program capable of being practiced by a computer for processing a target radiation image generated by radiation transmitted through a radiographic object, wherein the program comprises a program code for practicing image processing in such a manner that image characteristics of the target radiation image correspond to image characteristics of a radiation image for reference, which is determined beforehand, on the basis of image characteristics obtained from the radiation image for reference.

22. A storage medium storing a program capable of being practiced by a computer for processing a target radiation image generated by radiation transmitted through a radiographic object, wherein the program comprising:

a program code for obtaining image characteristics of a radiation image for reference and image characteristics of the target radiation image; and a program code for practicing image processing in such a manner that the image characteristics of the target radiation image correspond to the image characteristics of the radiation image for reference.

23. A storage medium storing a program capable of being practiced by a computer for processing a radiation image generated by radiation transmitted through a radiographic object, the program comprising:

a program code for recognizing a specified region corresponding to a prescribed structure of a radiographic object;

a program code for obtaining the image characteristics of the specified region through the analysis of image signals of the recognized specified region, and determining the image processing conditions on the basis of the image characteristics;

a program code for practicing image processing of a radiation image on the basis of the image processing conditions determined;

a program code for determining image processing conditions on the basis of the image characteristics of a specified region obtained from a radiation image for reference, or on the basis of the image characteristics of a specified region obtained from the radiation image for reference and the image characteristics of a specified region obtained from the target radiation image, a program code for practicing the image processing of a part or the whole of the target radiation image in such a manner that the image characteristics of the target radiation image correspond to the image characteristics of the radiation image for reference on the basis of the image processing conditions.

24. A storage medium storing a program capable of being practiced by a computer for processing a target radiation image generated by radiation transmitted through a radiographic object, the program comprising:

a program code for designating a specified region;

a program code for obtaining image characteristics of the specified region through the analysis of image signals of the specified region designated, and determining image processing conditions on the basis of the image characteristics;

a program code for practicing image processing of a radiation image on the basis of the image processing conditions determined;

a program code for determining image processing conditions on the basis of the image characteristics of a specified region obtained from a radiation image for reference, or on the basis of the image characteristics of a specified region obtained from the radiation image for reference and the image characteristics of a specified region obtained from the target radiation image; and a program code for practicing the image processing of a part or the whole of the target radiation image in such a manner that the image characteristics of the target radiation image correspond to the image characteristics of the radiation image for reference on the basis of the image processing conditions.

* * * * *